(12) United States Patent
Henderson

(10) Patent No.: US 10,280,037 B2
(45) Date of Patent: May 7, 2019

(54) HIGH SPEED WINCH REWIND ADAPTER

(71) Applicant: James L. Henderson, Argyle, TX (US)

(72) Inventor: James L. Henderson, Argyle, TX (US)

(*) Notice: Subject to any disclaimer, the term of this patent is extended or adjusted under 35 U.S.C. 154(b) by 301 days.

(21) Appl. No.: 15/393,134

(22) Filed: Dec. 28, 2016

(65) Prior Publication Data
US 2018/0179018 A1 Jun. 28, 2018

(51) Int. Cl.
B65H 75/30 (2006.01)
B60P 7/08 (2006.01)
B65H 54/58 (2006.01)

(52) U.S. Cl.
CPC .......... *B65H 75/305* (2013.01); *B60P 7/0846* (2013.01); *B65H 54/585* (2013.01); *B65H 2701/375* (2013.01)

(58) Field of Classification Search
CPC .............. B65H 75/305; B65H 54/585; B65H 2701/375; B60P 7/083; B60P 7/0853; B60P 7/0846; Y10T 24/2121; Y10T 24/21
See application file for complete search history.

(56) References Cited

U.S. PATENT DOCUMENTS

| | | | | |
|---|---|---|---|---|
| 5,564,717 | A * | 10/1996 | Alberts | B23B 31/00 279/145 |
| 6,139,233 | A | 10/2000 | Wilsey | |
| 6,467,755 | B2 | 10/2002 | Reilly et al. | |
| 6,546,596 | B2 * | 4/2003 | Grote | B05C 17/0205 15/143.1 |
| 6,705,597 | B1 | 3/2004 | Reilly et al. | |
| 6,729,604 | B1 * | 5/2004 | Claycomb | B60P 7/0846 24/68 R |
| 6,935,436 | B1 * | 8/2005 | Williston | B23B 31/1078 173/132 |
| 7,216,849 | B2 | 5/2007 | Tremblay | |
| 7,278,808 | B1 * | 10/2007 | Sisk, Sr. | B60P 7/0853 279/144 |
| 7,410,334 | B2 | 8/2008 | McGrew | |
| 7,410,336 | B2 * | 8/2008 | Parks | B60P 7/0846 279/144 |
| 7,413,170 | B2 * | 8/2008 | Ruan | B60P 7/083 24/69 CT |
| 7,527,462 | B2 | 5/2009 | Chou | |

(Continued)

OTHER PUBLICATIONS

International Search Report and Written Opinion issued in PCT/US17/68240 dated Mar. 13, 2018.

*Primary Examiner* — Michael E Gallion
(74) *Attorney, Agent, or Firm* — Foley & Lardner LLP (57) ABSTRACT

This disclosure describes a high speed winch rewind adapter for quickly rewinding a loading strap. In one implementation, the adapter includes a body having a volume sized to at least partially surround an annular end of the winch. The annular end is coupled with a ratchet mechanism of the winch and having at least one hole for receiving a winch bar. A drive connector is positioned both within the volume of the body and external to the volume of the body, the drive connector external to the volume of the body having an external profile to receive a torque, and the drive connector within the volume of the body insertable into the annular end of the winch for alignment to the axis of rotation. A coupling mechanism synchronizes the drive connector to the annular end such that both the drive connector and the annular end rotate simultaneously.

16 Claims, 4 Drawing Sheets

(56) References Cited

U.S. PATENT DOCUMENTS

| | | | |
|---|---|---|---|
| 7,566,194 B1 | 7/2009 | Gray et al. | |
| 7,618,021 B2 * | 11/2009 | Leone | B60P 7/083 |
| | | | 24/69 CT |
| 8,348,239 B2 | 1/2013 | Chou | |
| 8,550,436 B2 * | 10/2013 | Wang | B60P 7/083 |
| | | | 254/217 |
| 8,820,714 B2 * | 9/2014 | Shih | B25F 3/00 |
| | | | 254/126 |
| 8,967,595 B2 * | 3/2015 | Chou | B25B 25/00 |
| | | | 24/68 CD |
| 9,010,732 B2 * | 4/2015 | Zhu | B60P 7/0853 |
| | | | 24/69 CT |
| 9,156,652 B1 * | 10/2015 | Warboys | B65H 79/00 |
| 9,616,801 B2 * | 4/2017 | Williams | B60P 7/0853 |
| 9,915,290 B2 * | 3/2018 | Wilkinson | B60P 7/0846 |
| 10,124,713 B2 * | 11/2018 | Evans | B60P 7/0846 |
| 2001/0045550 A1 * | 11/2001 | Reilly | B60P 7/0846 |
| | | | 254/376 |
| 2002/0195594 A1 * | 12/2002 | Cauchon | B60P 7/083 |
| | | | 254/243 |
| 2004/0013490 A1 * | 1/2004 | Cauchon | B60P 7/083 |
| | | | 410/103 |
| 2005/0091800 A1 * | 5/2005 | Brown | B60P 7/083 |
| | | | 24/68 R |
| 2007/0114504 A1 * | 5/2007 | Ruan | B60P 7/083 |
| | | | 254/223 |
| 2008/0143057 A1 | 6/2008 | Knox et al. | |
| 2008/0251774 A1 | 10/2008 | Wendell | |
| 2011/0079967 A1 * | 4/2011 | Presley | B25F 3/00 |
| | | | 279/145 |

* cited by examiner

HIGH SPEED WINCH REWIND ADAPTER

FIELD

This disclosure relates to an apparatus to facilitate rotation of a winch for rewinding or tightening a strap.

BACKGROUND

Transportation of large cargo items is often open and not contained in a container. Large cargo items are often secured onto a flatbed of a vehicle using straps. Each strap is affixed at one end and adjustable on the other end. For example, on the adjustable end, the strap may be allowed to extend to sufficiently surround the large item and then be tightened to hold the large item against the flatbed to secure the large item.

There are many mechanisms to store, deploy, and tighten a strap. One of the popular devices is a weld-on winch that has a ratchet mechanism that includes a ratchet and a cam. The weld-on winch stores a roll of strap around its axis of rotation. When the cam is disengaged from the ratchet, a free end of the strap can be pulled to surround the cargo item. After sufficient length of the strap is pulled to surround the cargo item, the free end is then affixed to a point of attachment of the flatbed, such as by using a metal hook. The cam is reengaged to the ratchet to prevent the strap from further extending from the winch, and any loose portion of the strap will be rewound into the winch. The deployed strap will then be tightened to secure the cargo item. When the cargo item is to be removed from the flatbed, the cam is again disengaged from the ratchet to loosen the strap. The loose end of the strap is freed from the point of attachment and the strap is rewound onto the winch.

Rewinding the strap onto the winch is often a manual operation and time consuming, especially when there are many winches for one flatbed to provide different points of fixations. Winch bars for tightening the straps are designed to provide a long arm that enables an application of sufficient torque for tightening the straps and thus not suitable for fast rewind. Directly rewinding by hand is tiring and slow.

SUMMARY

This disclosure describes a high speed winch rewind adapter for quickly rewinding a loading strap. The winch rewind adapter enables a user to actuate the winch using a rotational power tool or a socket wrench, thus saving time and effort.

In a first general aspect, an adapter is coupleable with a winch that has an axis of rotation. The adapter is configured to rotate the winch along the axis of rotation when a torque is applied to the adapter. The adapter includes a body having a volume sized to at least partially surround an annular end of the winch. The annular end is coupled with a ratchet mechanism of the winch. The annular end has at least one hole for receiving a winch bar. A drive connector is positioned both within the volume of the body and external to the volume of the body. The drive connector external to the volume of the body has an external profile to receive a torque. The drive connector within the volume of the body is insertable into the annular end of the winch for alignment to the axis of rotation. An extension member is movable at least partially into and out of the volume of the body. The extension member is biased toward the drive connector. At least a portion of the extension member is configured to engage at least a portion of the at least one hole of the annular end of the winch when the adapter is coupled to the winch so that the winch may be rotated along the axis of rotation when a torque is applied to the external profile of the drive connector of the adapter.

In some embodiments, the adapter further includes a handle attached to the extension member for pulling the extension member away from the drive connector to disengage the adapter from the annular end.

In some other embodiments, the adapter further includes a resilient member for biasing the extension member toward the drive connector. For example, the resilient member is a coil spring. The extension member can further include a flange for engaging the coil spring.

In yet some other embodiments, the external profile includes a hex drill socket operable to receive a hex drill socket driver coupled to a power drill for powered winding.

In some embodiments, the external profile is coupleable to a socket wrench for manual winding, wherein the socket wrench is not directly coupleable to the winch.

In a second general aspect, a rewind adapter is coupleable with a winch having an axis of rotation. The rewind adapter includes a body having a volume partially surrounding an end of the winch. The end of the winch is coupled with a ratchet mechanism and has at least one hole for receiving a winch bar. A drive connector is positioned both within the volume of the body and external to the volume of the body. The drive connector external to the volume of the body has an external profile to receive a torque. The drive connector within the volume of the body is insertable into the end of the winch for alignment to the axis of rotation. An extension member is movable at least partially into and out of the volume of the body. The extension member is biased toward the drive connector. At least a portion of the extension member is configured to engage at least a portion of the at least one hole of the end of the winch when the adapter is coupled to the winch, so that the winch may be rotated along the axis of rotation when a torque is applied to the external profile of the drive connector of the rewind adapter.

In some embodiments, the rewind adapter further includes a handle attached to the extension member for pulling the extension member away from the drive connector to disengage the adapter from the end or to allow the drive connector to be coupled with the end without interference from the extension member. A resilient member may be used for biasing the extension member toward the drive connector. For example, the resilient member is a coil spring. The extension member may further include a flange for engaging the coil spring.

In some other embodiments, the external profile includes a hex drill socket operable to receive a hex drill socket driver coupled to a power drill for powered winding.

In yet some other embodiments, the external profile is coupleable to a socket wrench for manual winding, wherein the socket wrench is not directly coupleable to the winch.

In a third general embodiment, an adapter is coupleable with a winch having an axis of rotation. The adapter can rotate the winch along the axis of rotation when a torque is applied. The adapter includes a body having a volume sized to at least partially surround an annular end of the winch. The annular end is coupled with a ratchet mechanism of the winch and has at least one hole for receiving a winch bar. A drive connector is positioned both within the volume of the body and external to the volume of the body. The drive connector external to the volume of the body has an external profile to receive a torque. The drive connector within the volume of the body is insertable into the annular end of the winch for alignment to the axis of rotation. A coupling mechanism synchronizes the drive connector to the annular end such that both the drive connector and the annular end rotate simultaneously.

In some embodiments, the coupling mechanism includes an extension member movable at least partially into and out of the volume of the body. The extension member is biased toward the drive connector. At least a portion of the extension member is configured to engage at least a portion of the at least one hole of the annular end of the winch when the adapter is coupled to the winch so that the winch may be rotated along the axis of rotation when a torque is applied to the external profile of the drive connector of the adapter.

In some other embodiments, the adapter further includes a resilient member for biasing the extension member toward the drive connector. For example, the resilient member is a coil spring. The extension member may further include a flange for engaging the coil spring.

In yet some other embodiments, the external profile includes a hex drill socket operable to receive a hex drill socket driver coupled to a power drill for powered winding.

Detailed disclosure and examples are provided below.

BRIEF DESCRIPTION OF FIGURES

Like elements are labeled using like numerals.

DETAILED DESCRIPTION

This disclosure presents a high speed winch rewind adapter for quickly rewinding a loading strap on a winch. A trailer of a semi-truck (also called a trailer coupled to a tractor unit), may include a flatbed for carrying one or more large objects. In a typical trailer confirmation, one or more straps are positioned at spaced intervals along an edge of the trailer to secure cargo to the flatbed. Each strap has a loose end fixable to an attachment point on the flatbed and an adjustable end rolled onto a winch for adjusting length and tension. The loose end of the strap can include a clip or bent piece of metal that can be secured to an attachment point of the flatbed. The rewind adapter can enable a user to quickly rewind or tighten a deployed strap. An example winch and the rewind adapter are illustrated in FIGS. 1A-1C.

Figure 1A:
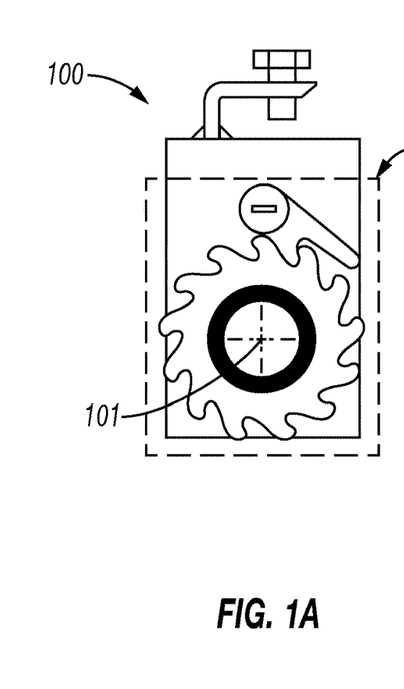
FIG. 1A is a side view of a winch showing the ratchet mechanism.
Figure 1B:
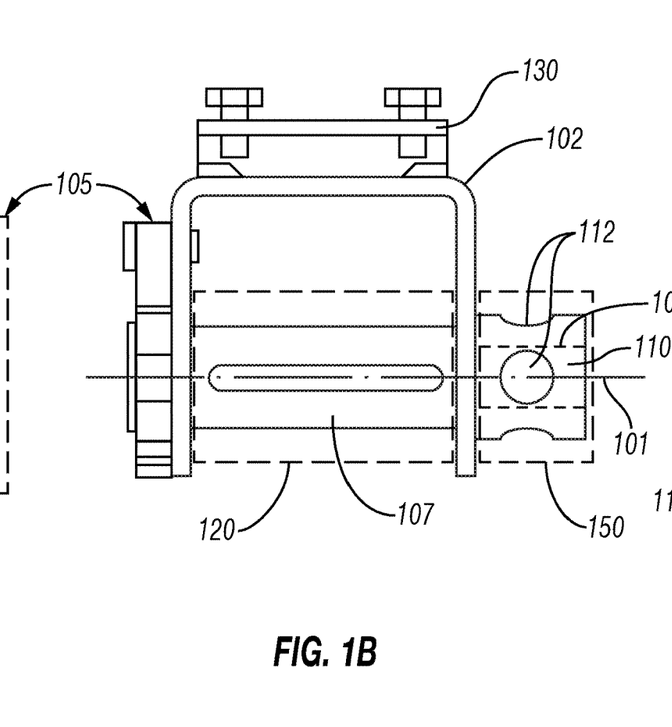
FIG. 1B is a front view of the winch with the rewind adapter.
Figure 1C:
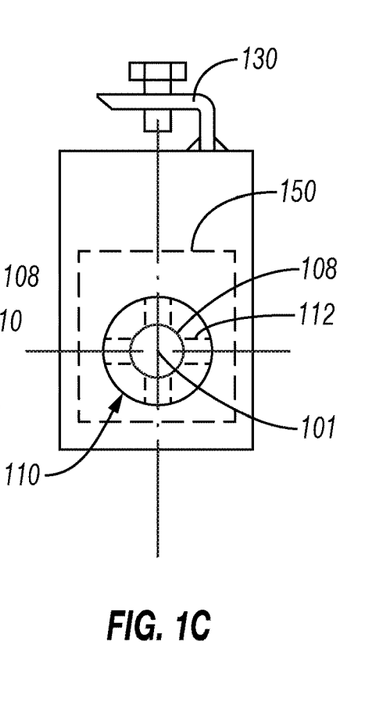
FIG. 1C is a side view of the winch showing the annular end.

As illustrated in FIG. 1A, a winch 100 often has a rotatable shaft 107 securing the adjustable end of the strap 120 (strap conceptually illustrated in FIG. 1B). The rotatable shaft 107 is supported by a frame 102 that may be weld-able, fastenable, or otherwise attachable to a flatbed or similar transportation structures via the support 130. Turning to FIG. 1B, the rotatable shaft 107 has one end coupled with a ratchet mechanism 105 and the other providing an interface for receiving a torque for rotation, i.e., an annular end 110. The annular end 110 includes a center hole 108 as shown in FIG. 1C and a number of radial holes 112 for receiving winch bars or other rotating device for turning the rotatable shaft 107. Part of the ratchet mechanism 105, the rotatable shaft 107, and the annular end 110 are rotatable around the axis of rotation 101.

In some embodiments, the annular end 110 may be on either side or both sides of the frame 102. For example, although the annular end 110 is illustrated on the right side in FIG. 1B, the annular end 110 may be swapped with the ratchet mechanism 105. In some embodiments, each of both ends of the rotatable shaft 107 may be the annular end 110 while the ratchet mechanism 105 is integrated into the rotatable shaft 107 or the frame 102. For example, the ratchet mechanism 105 can be any mechanism that enables the rotatable shaft 107 to rotate in one direction and restrains the rotatable shaft 107 to rotate in the other direction.

The present disclosure concerns with a high speed rewind adapter 150 that is attachable to the annular end 110. It should be understood that the rewind adapter 150 may have different sizes according to various winch shapes and sizes, as long as the winch includes an annular end that includes a center hole and at least one radial hole similar to the annular end 110.

Figure 2A:
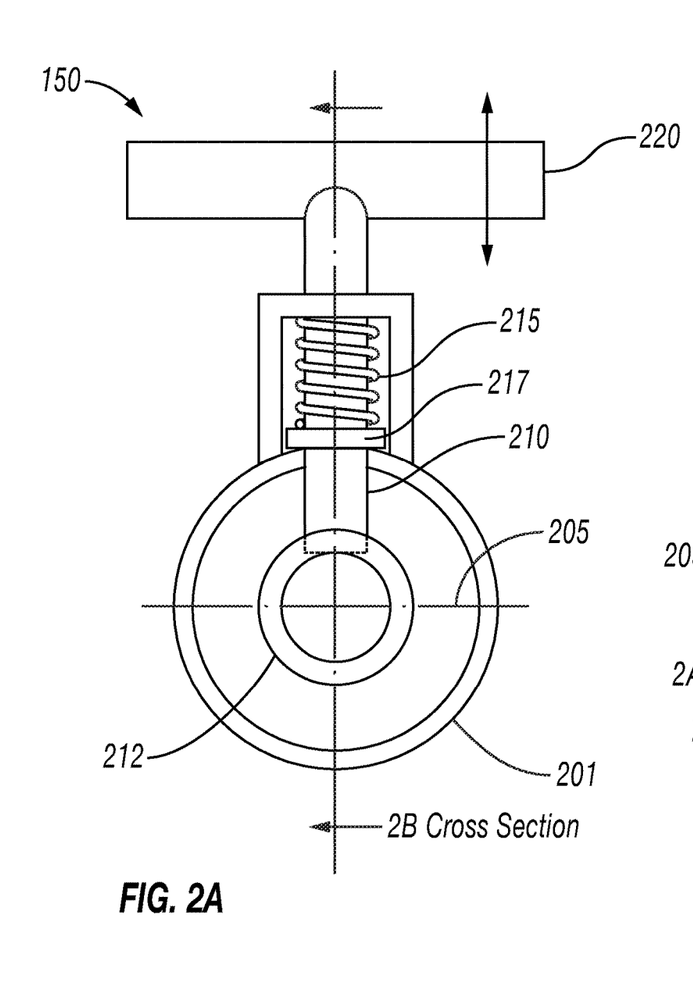
FIG. 2A is a front view of the rewind adapter.
Figure 2B:
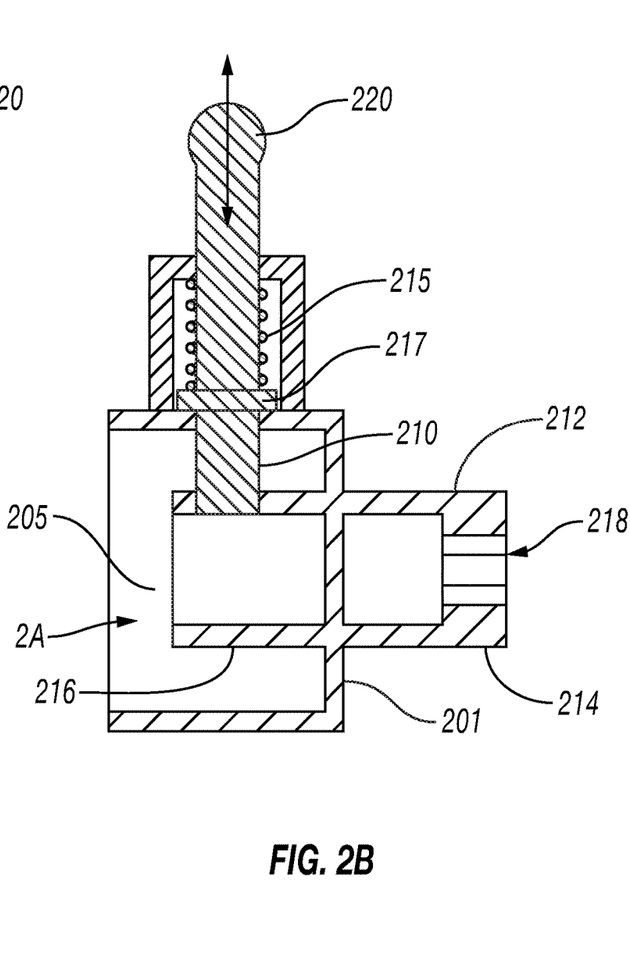
FIG. 2B is a cross sectional side view of the rewind adapter.

Turning now to FIGS. 2A and 2B, FIG. 2A is a front view of the rewind adapter 150. FIG. 2B is a cross sectional side view of the rewind adapter 150. The rewind adapter 150 includes a body 201 that encloses a volume 205. The volume 205 is sized to at least partially surround the annular end 110 of the winch 100. For example, the body 201 as illustrated is cylindrical in shape. The inner diameter of the body 201 is equal to or greater than the outer diameter of the annular end 110 in order to have the volume 205 partially surround the annular end 110. In some embodiments, the body 201 has a depth greater than the thickness of the annular end 110 to completely enclose the annular end 110. In other embodiments, the body 201 has a depth less than the thickness of the annular end 100 so the volume 205 can be filled by the annular end 110. Although the body 201 is illustrated as a cylindrical shape, other shapes of the body may be applied as long as the volume 205 can partially surround the annular end 110. For example, the body 201 may be of an elliptical, square, or rectangular shape.

The rewind adapter 150 further includes a drive connector 212 positioned both within the volume 205 of the body 201 and external to the volume 205 of the body 201. The drive connector 212 external to the volume 205 of the body 201 has an external profile 214 to receive a torque. The internal portion 216 of the drive connector 212 that is within the volume 205 of the body 201 is insertable into the center hole 108 of the annular end 110 of the winch 100 for alignment to the axis of rotation 101.

The rewind adapter 150 further includes an extension member 210 movable at least partially into and out of the volume 205 of the body 201. The extension member 210 is biased toward the drive connector 212. At least a portion of the extension member 210 is configured to engage at least a portion of the at least one radial hole 112 of the annular end 110 of the winch 100 when the adapter 150 is coupled to the winch 100 so that the winch 100 may be rotated along the axis of rotation 101 when a torque is applied to the external profile 212 of the drive connector 212 of the rewind adapter 150.

Figure 3:
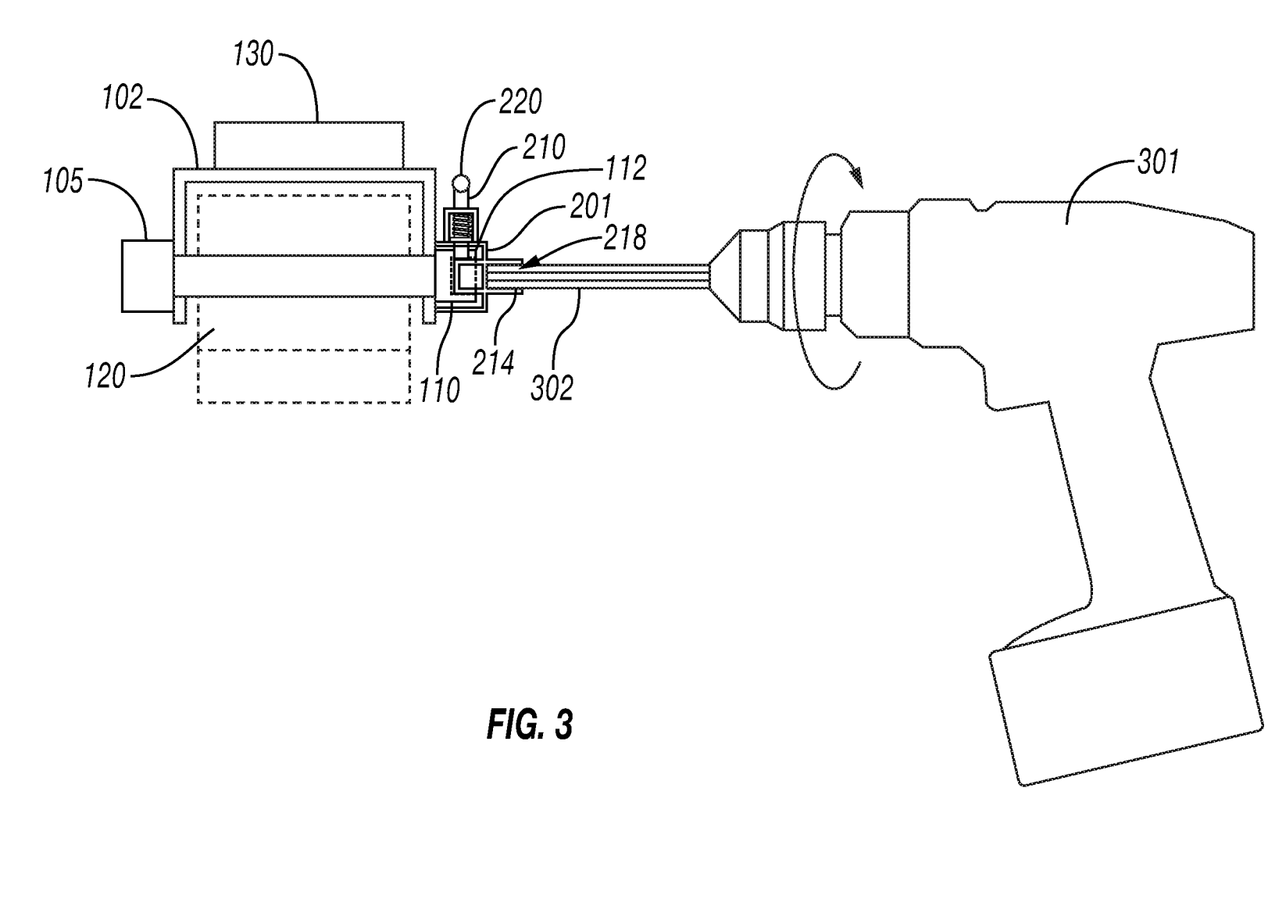
FIG. 3 shows a rewind operation using a power tool connected to the rewind adapter to actuate the winch.
Figure 4:
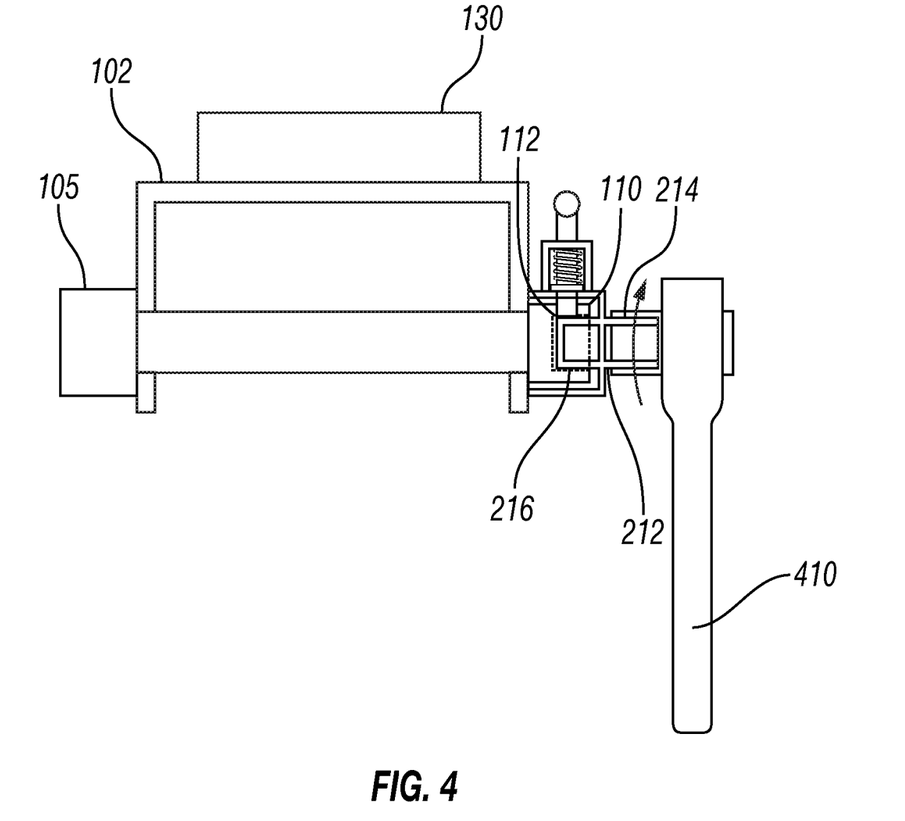
FIG. 4 shows a rewind operation using a socket wrench connected to the rewind adapter to actuate the winch.

In some embodiments, the external profile 214 includes a hex drill socket 218 operable to receive a hex drill socket driver 302 coupled to a power drill 301 for powered winding, as illustrated in FIG. 3. In other embodiments, when a power drill 301 or a hex drill socket driver 302 is not available, the external profile 214 is coupleable to a socket wrench 410 for manual winding, as illustrated in FIG. 4. The socket wrench 410 may not be directly coupleable to the annular end 110.

The rewind adapter 150 further includes a handle 220 attached to the extension member 210 for pulling the extension member 210 away from the drive connector 212 to disengage the rewind adapter 150 from the annular end 110. A resilient member 215 for biasing the extension member 210 toward the drive connector 212, such as a coil spring for example, is placed in a support compartment of the body 201. The resilient member 215 is held fixed at the end that contacts an end wall of the support compartment of the body 201 and is held against a flange 217 affixed onto the extension member 210. At rest, the flange 217 is pressed against the body 201.

As illustrated in FIG. 2A, the extension member 210 may be partially extended into the drive connector 212 that includes a hole for receiving the extension member 210. In some embodiments, the hole may be a partial cavity, depending on the length of the extension member 210, to accommodate a partial insertion. In some other embodiments, the drive connector 212 may not provide a hole or partial cavity for accepting the extension member 210 to pass through; and the extension member 210 may be stopped at the drive connector 212 when the flange 217 does not rest on the body 201 as in the example of FIG. 2A.

Other implementations are possible. For example, the resilient member 215 biasing the extension member 210 could be made of rubber or other elastic materials rather than a metal spring coil. In some embodiments, the handle 220 of the extension member 210 may be designed to lift the extension member 210 by pressing rather than by lifting. In some other embodiments, two or more extension members may be included to engage two or more of the radial holes 112 of the annular end 110. In some other variations, the outer profile 214 may be able to directly engage a power tool without coupling with a hex drill socket driver, for example, when a chuck of the power tool can directly engage the outer profile 214. Other variations are possible within the scope of this disclosure.

What is claimed is:

1. An adapter for coupling with a winch having an axis of rotation and configured to rotate the winch along the axis of rotation when a torque is applied, the adapter comprising:
   a body having a volume sized to at least partially surround an end of the winch, the end of the winch coupled with a ratchet mechanism of the winch and having at least one hole for receiving a winch bar;
   a drive connector positioned both within the volume of the body and external to the volume of the body, the drive connector external to the volume of the body having an external profile to receive a torque, and the drive connector within the volume of the body insertable into the end of the winch for alignment to the axis of rotation; and
   an extension member movable at least partially into and out of the volume of the body and biased toward the drive connector, wherein at least a portion of the extension member is configured to engage at least a portion of the at least one hole of the end of the winch when the adapter is coupled to the winch so that the winch may be rotated along the axis of rotation when a torque is applied to the external profile of the drive connector of the adapter; a resilient member for biasing the extension member toward the drive connector.

2. The adapter of claim 1, further comprising a handle attached to the extension member for pulling the extension member away from the drive connector to disengage the adapter from the end, which is provided as an annular end.

3. The adapter of claim 1, wherein the resilient member is a coil spring.

4. The adapter of claim 3, wherein the extension member further comprises a flange for engaging the coil spring.

5. The adapter of claim 1, wherein the external profile comprises a hex drill socket operable to receive a hex drill socket driver coupled to a power drill for powered winding.

6. The adapter of claim 1, wherein the external profile is coupleable to a socket wrench for manual winding, wherein the socket wrench is not directly coupleable to the winch.

7. A rewind adapter for coupling with a winch having an axis of rotation, the rewind adapter comprising:
   a body having a volume partially surrounding an end of the winch, the end coupled with a ratchet mechanism of the winch and having at least one hole for receiving a winch bar;
   a drive connector positioned both within the volume of the body and external to the volume of the body, the drive connector external to the volume of the body having an external profile to receive a torque, and the drive connector within the volume of the body insertable into the end of the winch for alignment to the axis of rotation; and
   an extension member movable at least partially into and out of the volume of the body and biased toward the drive connector, wherein at least a portion of the extension member is configured to engage at least a portion of the at least one hole of the end of the winch when the adapter is coupled to the winch so that the winch may be rotated along the axis of rotation when a torque is applied to the external profile of the drive connector of the rewind adapter; a resilient member for biasing the extension member toward the drive connector.

8. The rewind adapter of claim 7, further comprising a handle attached to the extension member for pulling the extension member away from the drive connector to disengage the adapter from the end.

9. The rewind adapter of claim 7, wherein the resilient member is a coil spring.

10. The rewind adapter of claim 9, wherein the extension member further comprises a flange for engaging the coil spring.

11. The rewind adapter of claim 7, wherein the external profile comprises a hex drill socket operable to receive a hex drill socket driver coupled to a power drill for powered winding.

12. The rewind adapter of claim 7, wherein the external profile is coupleable to a socket wrench for manual winding, wherein the socket wrench is not directly coupleable to the winch.

13. An adapter for coupling with a winch having an axis of rotation and configured to rotate the winch along the axis of rotation when a torque is applied, the adapter comprising:
   a body having a volume sized to at least partially surround an annular end of the winch, the annular end coupled with a ratchet mechanism of the winch and having at least one hole for receiving a winch bar;
   a drive connector positioned both within the volume of the body and external to the volume of the body, the drive connector external to the volume of the body having an external profile to receive a torque, and the drive connector within the volume of the body insertable into the annular end of the winch for alignment to the axis of rotation; and a coupling mechanism synchronizing the drive connector to the annular end such that both the drive connector and the annular end rotate simultaneously; wherein the coupling mechanism comprises an extension member movable at least partially into and out of the volume of the body and biased toward the drive connector, wherein at least a portion of the extension member is configured to engage at least a portion of the at least one hole of the annular end of the winch when the adapter is coupled to the winch so that the winch may be rotated along the axis of rotation when a torque is applied to the external profile of the drive connector of the adapter; a resilient member for biasing the extension member toward the drive connector.

14. The adapter of claim 13, wherein the resilient member is a coil spring and the extension member further comprises a flange for engaging the coil spring.

15. The adapter of claim 1, wherein the external profile comprises a hex drill socket operable to receive a hex drill socket driver coupled to a power drill for powered winding.

16. A powered adapter for coupling with a winch having an axis of rotation and configured to rotate the winch along the axis of rotation when a torque is applied, the adapter comprising:

a rotational power source configured to provide rotational motion;

a body having a volume sized to at least partially surround an end of the winch, the end of the winch coupled with a ratchet mechanism of the winch and having at least one hole for receiving a winch bar;

a drive connector positioned both within the volume of the body and external to the volume of the body, the drive connector external to the volume of the body having an external profile to receive a torque, and the drive connector within the volume of the body insertable into the end of the winch for alignment to the axis of rotation, wherein the drive connector is rotationally coupled with the rotational power source to rotate the drive connector by applying the torque to the external profile; and an extension member movable at least partially into and out of the volume of the body and biased toward the drive connector, wherein at least a portion of the extension member is configured to engage at least a portion of the at least one hole of the end of the winch when the adapter is coupled to the winch so that the winch may be rotated along the axis of rotation when the torque is applied to the external profile of the drive connector of the adapter; a resilient member for biasing the extension member toward the drive connector.

* * * * *

UNITED STATES PATENT AND TRADEMARK OFFICE
CERTIFICATE OF CORRECTION

PATENT NO. : 10,280,037 B2
APPLICATION NO. : 15/393134
DATED : May 7, 2019
INVENTOR(S) : James L. Henderson

Page 1 of 1

It is certified that error appears in the above-identified patent and that said Letters Patent is hereby corrected as shown below:

In the Claims

At Column 7, Claim number 15, Line number 18, delete "1" and add -- 13 --

Signed and Sealed this
Twentieth Day of August, 2019

Andrei Iancu
*Director of the United States Patent and Trademark Office*